US011197033B2

(12) United States Patent
Carapelli

(10) Patent No.: US 11,197,033 B2
(45) Date of Patent: Dec. 7, 2021

(54) FUEL DISPENSER ALTERNATIVE CONTENT CONTROL BASED ON MONITORED FUELING TRANSACTION PHASE

(71) Applicant: Gilbarco Inc., Greensboro, NC (US)

(72) Inventor: Giovanni Carapelli, High Point, NC (US)

(73) Assignee: Gilbarco Inc., Greensboro, NC (US)

( * ) Notice: Subject to any disclaimer, the term of this patent is extended or adjusted under 35 U.S.C. 154(b) by 277 days.

(21) Appl. No.: 15/992,966

(22) Filed: May 30, 2018

(65) Prior Publication Data
US 2018/0352265 A1 Dec. 6, 2018

Related U.S. Application Data

(60) Provisional application No. 62/512,422, filed on May 30, 2017.

(51) Int. Cl.
G06Q 20/18 (2012.01)
G06Q 20/20 (2012.01)
H04N 21/214 (2011.01)
B67D 7/08 (2010.01)
G07F 13/02 (2006.01)
(Continued)

(52) U.S. Cl.
CPC ............ H04N 21/214 (2013.01); B67D 7/08 (2013.01); G06Q 20/145 (2013.01); G06Q 20/18 (2013.01); G06Q 20/20 (2013.01); G06Q 20/202 (2013.01); G06Q 20/209 (2013.01); G06Q 30/02 (2013.01); G07F 9/023 (2013.01); G07F 13/025 (2013.01); B67D 7/04 (2013.01); B67D 7/14 (2013.01)

(58) Field of Classification Search
CPC ......... G06Q 20/18; G06Q 20/20; G06Q 30/02
USPC .................................... 705/16, 14.4
See application file for complete search history.

(56) References Cited

U.S. PATENT DOCUMENTS 4,967,366 A   10/1990  Kaehler
5,689,071 A   11/1997  Ruffner et al.
(Continued)

OTHER PUBLICATIONS

International Search Report and Written Opinion dated Aug. 10, 2018 in corresponding international application serial No. PCT/US2018/035109, all enclosed pages cited.
(Continued)

Primary Examiner — Florian M Zeender
Assistant Examiner — Christopher R Buchanan
(74) Attorney, Agent, or Firm — Nelson Mullins Riley & Scarborough LLP

(57) ABSTRACT

In an example embodiment, a card reader in dispenser (CRIND) is provided including a processor and a memory including computer program code, the memory and the computer programming code configured to, with the processor, cause the CRIND to receive one or more transaction messages from a forecourt controller or a peripheral device associated with a fuel dispenser, compare the one or more transaction messages to one or more message sequences associated with transaction phases of a fuel dispenser, determine a transaction phase of the fuel dispenser based on the comparison of the one or more transaction messages with the one or more message sequences, and cause feature processing circuitry to provide selected alternative media content to a user interface of the fuel dispenser based on the determined transaction phase.

16 Claims, 10 Drawing Sheets

(51) Int. Cl.
*G06Q 20/14* (2012.01)
*G07F 9/02* (2006.01)
*G06Q 30/02* (2012.01)
*B67D 7/04* (2010.01)
*B67D 7/14* (2010.01)

(56) References Cited

U.S. PATENT DOCUMENTS

| | | | |
|---|---|---|---|
| 5,734,851 | A | 3/1998 | Leatherman et al. |
| 5,956,259 | A | 9/1999 | Hartsell, Jr. et al. |
| 6,052,629 | A | 4/2000 | Leatherman et al. |
| 6,435,204 | B2 | 8/2002 | White et al. |
| 6,904,592 | B1 * | 6/2005 | Johnson ............... G06F 8/65 705/52 |
| 6,935,191 | B2 | 8/2005 | Olivier et al. |
| 7,107,231 | B1 | 9/2006 | Hall et al. |
| 8,438,064 | B2 | 5/2013 | Berrio et al. |
| 9,268,930 | B2 | 2/2016 | Williams et al. |
| 9,715,600 | B2 | 7/2017 | Williams et al. |
| 9,972,159 | B2 | 5/2018 | Carapelli et al. |
| 10,102,401 | B2 | 10/2018 | Carapelli |
| 10,332,083 | B2 | 6/2019 | Williams et al. |
| 2009/0048706 | A1 * | 2/2009 | DeLine ............... B67D 7/346 700/231 |
| 2009/0265638 | A1 | 10/2009 | Carapelli et al. |
| 2010/0325003 | A1 * | 12/2010 | Ringeman ........... G07F 13/025 705/21 |
| 2011/0226854 | A1 * | 9/2011 | Stoudt ............... G07F 13/00 235/380 |
| 2013/0264385 | A1 * | 10/2013 | Stoudt ............... G06Q 20/387 235/380 |
| 2014/0089073 | A1 | 3/2014 | Jacobs et al. |
| 2014/0089174 | A1 | 3/2014 | Carapelli et al. |
| 2014/0274314 | A1 * | 9/2014 | Cage ................ G07F 17/3255 463/25 |
| 2016/0307185 | A1 | 10/2016 | Betancourt |
| 2017/0278338 | A1 * | 9/2017 | Payne ................ G06Q 20/382 |
| 2017/0308964 | A1 * | 10/2017 | Morris .............. G06K 9/00268 |
| 2017/0358040 | A1 * | 12/2017 | Williams ............... B67D 7/14 |
| 2019/0042803 | A1 | 2/2019 | Carapelli |

OTHER PUBLICATIONS

"Applause (TM) Media System Control Center User Manual, for Gilbarco (R) Dispensers with 10.4" Color Display," MDE-4349C, by John Williams, copyright Aug. 2009 to Gilbarco Veeder-Root, all enclosed pages cited.

* cited by examiner

FUEL DISPENSER ALTERNATIVE CONTENT CONTROL BASED ON MONITORED FUELING TRANSACTION PHASE

PRIORITY CLAIM

This application is based upon and claims priority to provisional application Ser. No. 62/512,422, filed May 30, 2017, which is relied upon and incorporated herein by reference in its entirety.

FIELD OF THE INVENTION

The present invention relates generally to service stations at which fuel is dispensed. More particularly, the present invention relates to a fuel dispensing environment including a fuel dispenser that controls alternative content at the user interface based on a monitored transaction phase.

BACKGROUND

Retail fueling environments usually include a plurality of fuel dispensers located in a forecourt area outside of a convenience store building. Typically, the fuel dispensers will each be equipped with pay-at-the-pump capability by which the customer can perform the fueling transaction using a user interface on the respective fuel dispenser. For example, the customer can present a credit or debit card using a card reader installed on the fuel dispenser's user interface to pay for the fuel without entering the store. In other cases, the customer may want or need to go into the convenience store to pay for the fuel or to purchase other items.

The convenience store will generally be equipped with a point-of-sale (POS) system to handle certain functions relating to transactions that occur in the retail fueling environment. For instance, the POS may include software components adapted to display a graphical user interface (GUI) for store personnel or customers. Transactions are recorded using the POS for inventory reconciliation and other record-keeping purposes. In addition, the POS may allow the station's manager the ability to set options associated with the POS or the service station, such as the appearance of receipts issued by the station's dispensers.

Payment approval and control of the fueling process by the fuel dispensers in the forecourt is handled by a "forecourt controller" (FCC), which may or may not be part of the POS, communicating with a CRIND (card reader in dispenser) apparatus in the electronics compartment of each fuel dispenser. The CRIND apparatus is driven by the FCC to make various prompts to the customer and provides the responses to the FCC. If the payment is approved, the FCC then instructs the CRIND that fueling is authorized so that the fueling process can commence. In other words, the CRIND does not "know" its own state (with exception of nozzle being lifted). As a result, the CRIND cannot drive media content in sync with various phases of a complete fueling transaction (including idle). The only way this can occur in current fuel dispensing environments is to modify the FCC sequence to "tell the CRIND" what phase is active and hence enabling the "switch" to alternative content.

SUMMARY OF CERTAIN ASPECTS

The present invention recognizes and addresses the foregoing considerations, and others, of prior art construction and methods. In this regard, certain exemplary and non-limiting aspects of the present invention will now be described. These aspects are intended to provide some context for certain principles associated with the present invention, but are not intended to be defining of the full scope of the present invention.

In an example embodiment, a CRIND apparatus is provided including a processor and a memory having computer program code, the memory and the computer program code configured to, with the processor, cause the CRIND apparatus to receive one or more transaction messages from a forecourt controller or a peripheral device associated with a fuel dispenser, compare the one or more transaction messages to stored message information associated with transaction phases of a fuel dispenser, determine a transaction phase of the fuel dispenser based on the comparison of the one or more transaction messages with the stored message information, and cause feature processing circuitry to provide a selected alternative content to a user interface of the fuel dispenser based on the determined transaction phase.

In another example embodiment, a CRIND apparatus is provided including a processor and a memory having computer program code, the memory and the computer program code configured to, with the processor, cause the CRIND to receive a first one or more transaction messages from a forecourt controller or a peripheral device associated with a fuel dispenser, receive an indication of a transaction phase from a technician computing device, and associate the first one or more transaction messages with the indicated transaction phase.

In yet another example embodiment, a CRIND apparatus is provided including a processor and a memory including computer program code, the memory and the computer program code configured to, with the processor, cause the CRIND apparatus to receive one or more transaction messages from a forecourt controller or a peripheral device associated with a fuel dispenser, determine a first transaction message sequence based on the one or more transaction messages and a first transaction phase criteria, and associate the first transaction message sequence with a first transaction phase.

Additional embodiments may include apparatuses and methods similar to those described above with respect to the fuel dispensing environment. Different systems and methods of the present invention utilize various combinations of the disclosed elements and method steps as supported by the overall disclosure herein. Thus, combinations of elements other than those discussed above may be claimed. Moreover, the accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Figure 1:
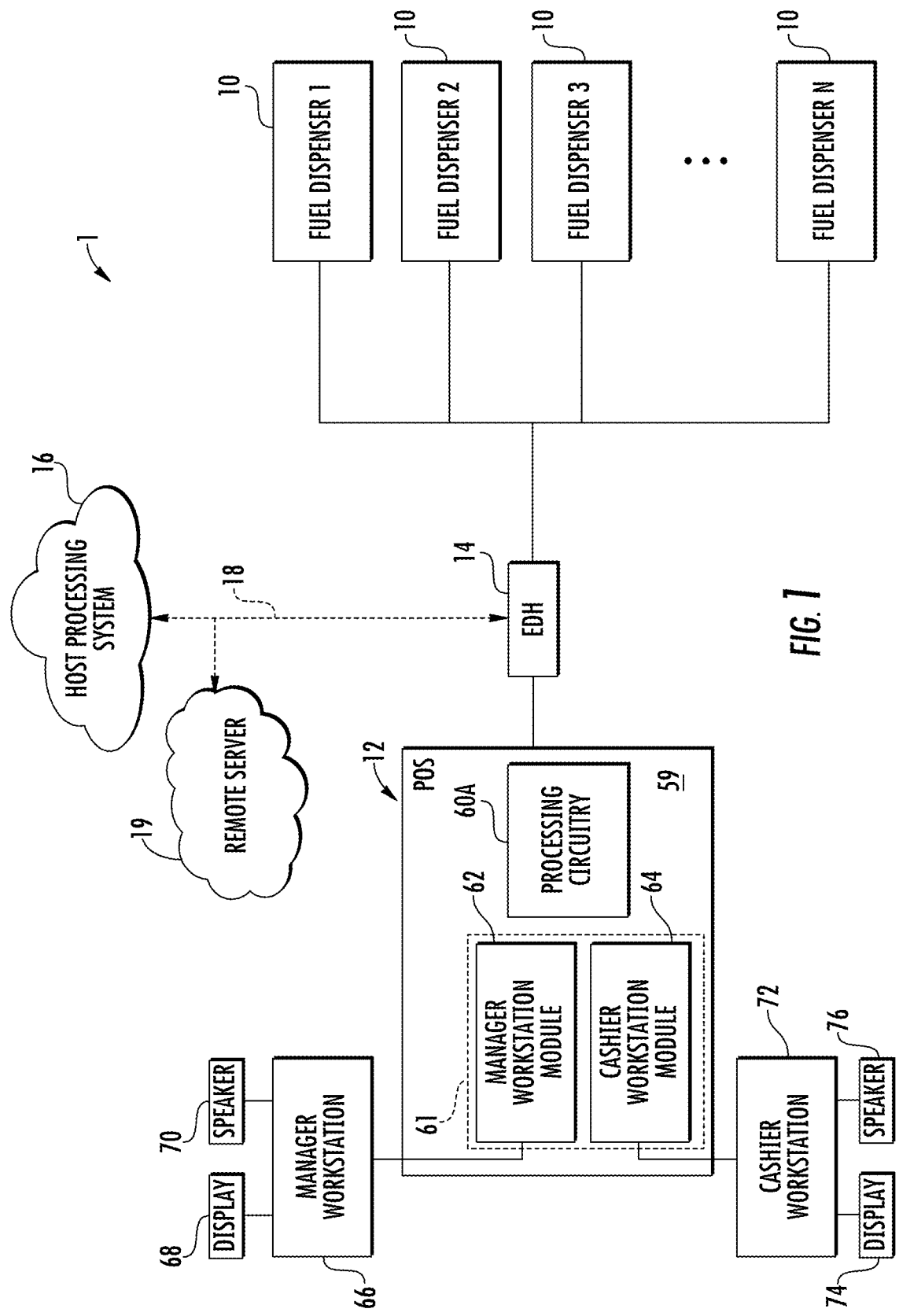
FIG. 1 is a diagrammatic representation of a retail fueling environment incorporating certain aspects of the present invention.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

In a typical fueling environment, the fuel dispenser may include peripheral control circuitry, referred to herein as a "CRIND," which controls peripheral devices associated with the fuel dispenser, such as displays, touchscreens, PIN pads, soft keys, card readers, receipt printers, or the like. The CRIND may receive commands from a forecourt controller (which may or may not be incorporated into the POS), which executes a fueling transaction script using a predetermined protocol (such as a secure payment outside terminal or "SPOT") protocol. The fueling transaction script may include commands associated with phases of the fueling transaction, which may be triggered by a user's interaction with one or more of the peripheral devices associated with the fuel dispenser. For example, lifting the fuel nozzle out of a fuel nozzle cradle may be detected by the CRIND and transmitted to the forecourt controller, indicating that a fueling operation has commenced. Advertising content may be shown on the display during the fueling operation.

Generally, changing when and/or what content is supplied to the display requires a change to the fueling transaction script executed by the POS or forecourt controller, due to the CRIND acting only as a driven device unaware of the fueling transaction phase. However, changing the fueling transaction script of the POS and/or forecourt controller may be costly, complex, or otherwise unfavorable to owners of fueling environments.

In some examples, a CRIND may have a limited ability to know a transaction phase, such as the fueling phase. For example, the CRIND may receive an indication of the fuel nozzle being removed from the fuel nozzle cradle at the commencement of a fueling operation. However, the CRIND is unaware of other transaction phases in which additional content or functionality may be advantageous.

In an example embodiment of the present invention, a CRIND may be configured to monitor the signals from the forecourt controller and the peripheral devices that control the fueling operation. Based on these signals, and not specific signals related to alternative content from the FCC, the CRIND can determine a transaction phase, without changing or interfering with the fueling transaction script run by the forecourt controller. The CRIND may compare one or more transaction messages to stored message information to determine a transaction phase of the fuel dispenser, such as idle, fueling, fuel grade prompt, receipt printing, fueling complete, secure processing, or the like. Based on the determined transaction phase, the CRIND may cause feature processing circuitry associated with the fuel dispenser to provide selected alternative content to the user interface, e.g., display of the fuel dispenser.

In some example embodiments, the CRIND may be configured to cause a user interface access switch to allow alternative media content to be transmitted to the user interface based on the determined transaction phase, or prevent the alternative media content from being transmitted to the user interface when the fuel dispenser is in a secure processing transaction phase.

In an example embodiment, the CRIND may be configured to cause one or more peripheral devices to perform an action based on the determined transaction phase. For example, the CRIND may cause a receipt printer to print a coupon, activate a card reader or code scanner for receiving loyalty program information, activate a touch screen for virtual scratch tickets or other games, or any other suitable action.

Since existing CRINDs are configured to receive the transaction messages and control one or more peripheral devices, fuel dispenser CRINDS may be retrofitted to determine the transaction phase by changing the firmware running on the CRIND without changing physical components or connections. Further, the additional functionality provided by the CRIND being "aware" of the transaction phase is passive to the fueling transaction script, thus requiring no changes to the fueling transaction script executed by the forecourt controller.

In an example embodiment, the transaction sequences may be learned by a CRIND in a training mode automatically or with technician assistance. The training mode may be performed on one CRIND associated with a particular fueling transaction script and used by any CRIND using the same fueling transaction script. In an example embodiment utilizing an automatic learning training mode, the CRIND may monitor the transaction messages and determine a transaction phase based on a transaction phase criteria, such as a time interval associated with a transaction message. The CRIND may determine after one or more transaction cycles that the longest time interval between transaction messages is preceded by a certain transaction message or sequence of transaction messages and associate such transaction message (or sequence) with a first transaction phase, such as idle. Similarly, the CRIND may determine that the next longest interval is preceded by another transaction message (or sequence of transaction messages) and associate the transaction message (or sequence) with a second transaction phase, such as fueling.

In an example embodiment in which the training mode is technician assisted, a separate computing device may be connected to the CRIND to provide the CRIND an indication of one or more transaction phases during the fueling operation. The CRIND receives a first one or more transaction messages and the technician may indicate via the computing device which transaction phase is present. This association is stored by the CRIND for subsequent use after the training process is concluded. The CRIND may then receive subsequent transaction messages and use the stored association to determine various actual transaction phases.

Example Fueling Environment

FIG. 1 illustrates an exemplary retail fueling environment 1 in accordance with an embodiment of the present invention. One or more fuel dispensers 10 are located in the forecourt region of the retail fueling environment. The fuel dispensers 10 are operative to dispense fuel supplied from one or more underground storage tanks (USTs) into a customer's vehicle. Typically, the fuel dispensers 10 will be provided with "pay-at-the-pump" capability, allowing the customer to authorize and pay for the fueling transaction at the dispenser itself. The retail fueling environment 1 also includes a point-of-sale (POS) system 12 that handles in-store sales activities, as well as various inventory and configuration functions.

Although embodiments are contemplated in which the forecourt controller (FCC) and electronic payment server is incorporated into POS 12, the illustrated embodiment utilizes an enhanced dispenser hub (EDH) 14 as shown and described in U.S. Pat. No. 8,438,064 (incorporated fully herein by reference for all purposes). EDH 14 includes an electronic payment server that allows processing of payment card information. In particular, credit (or debit) card information from the fuel dispensers 10 and any in-store card readers is fed to EDH 14, which seeks approval from a remote host processing system 16 via a suitable off-site communication link 18.

Figure 2:
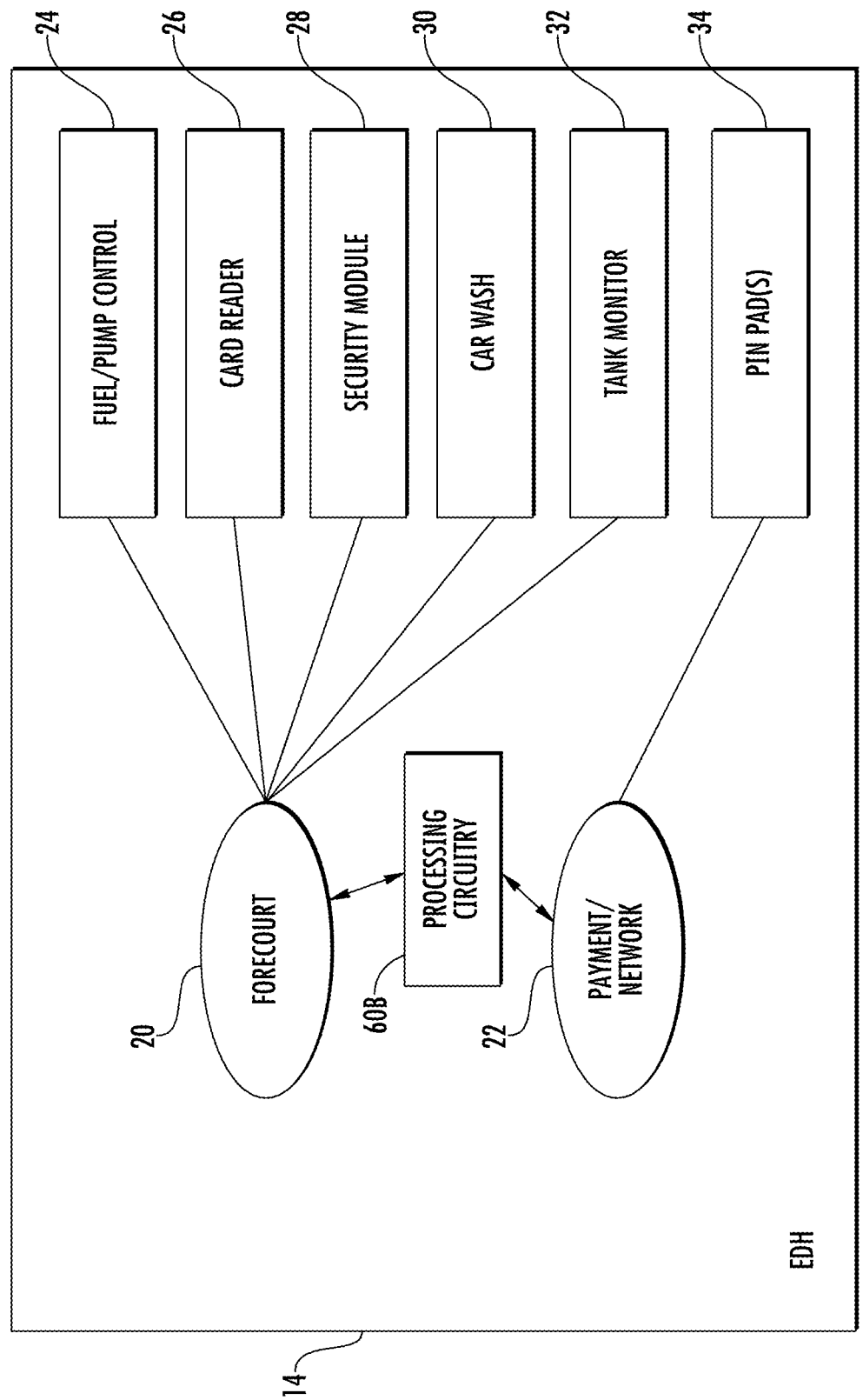
FIG. 2 is a diagrammatic representation showing additional details of the enhanced dispenser hub of FIG. 1.

Referring now to FIG. 2, EDH 14 includes processing circuitry 60B for running a forecourt module 20 and a payment/network module 22. Forecourt module 20, e.g. forecourt controller, is adapted to control the operation of devices located in the retail fueling environment's forecourt. In this example, forecourt module 20 comprises several modules, including fuel/pump control module 24, card reader module 26, security module 28, car wash module 30, and tank monitor module 32. The fuel/pump control module 24 handles operation of dispensers 10, while the car wash module 30 handles operation of any on-site car washes. The tank monitor module 32 handles operation of any tank monitors connected to the underground storage tanks of the retail fueling environment. The card reader module 26 handles operation of the card readers of the retail fueling environment, such as the card readers of dispensers 10. The security module 28 handles encryption of the sensitive information transmitted by the components of retail fueling environment. For instance, payment card data received by the various card readers in the retail fueling environment may be handled by the card reader module 26 and encrypted by the security module 28.

Payment module 22 performs validation of the payment card information received by the various card readers in the retail fueling environment. In particular, payment module 22 handles communications to and from the host processing system 16. As shown, payment module 22 communicates with a PIN pad module 34 when information from a PIN pad is necessary to process the transaction.

Figure 3A:
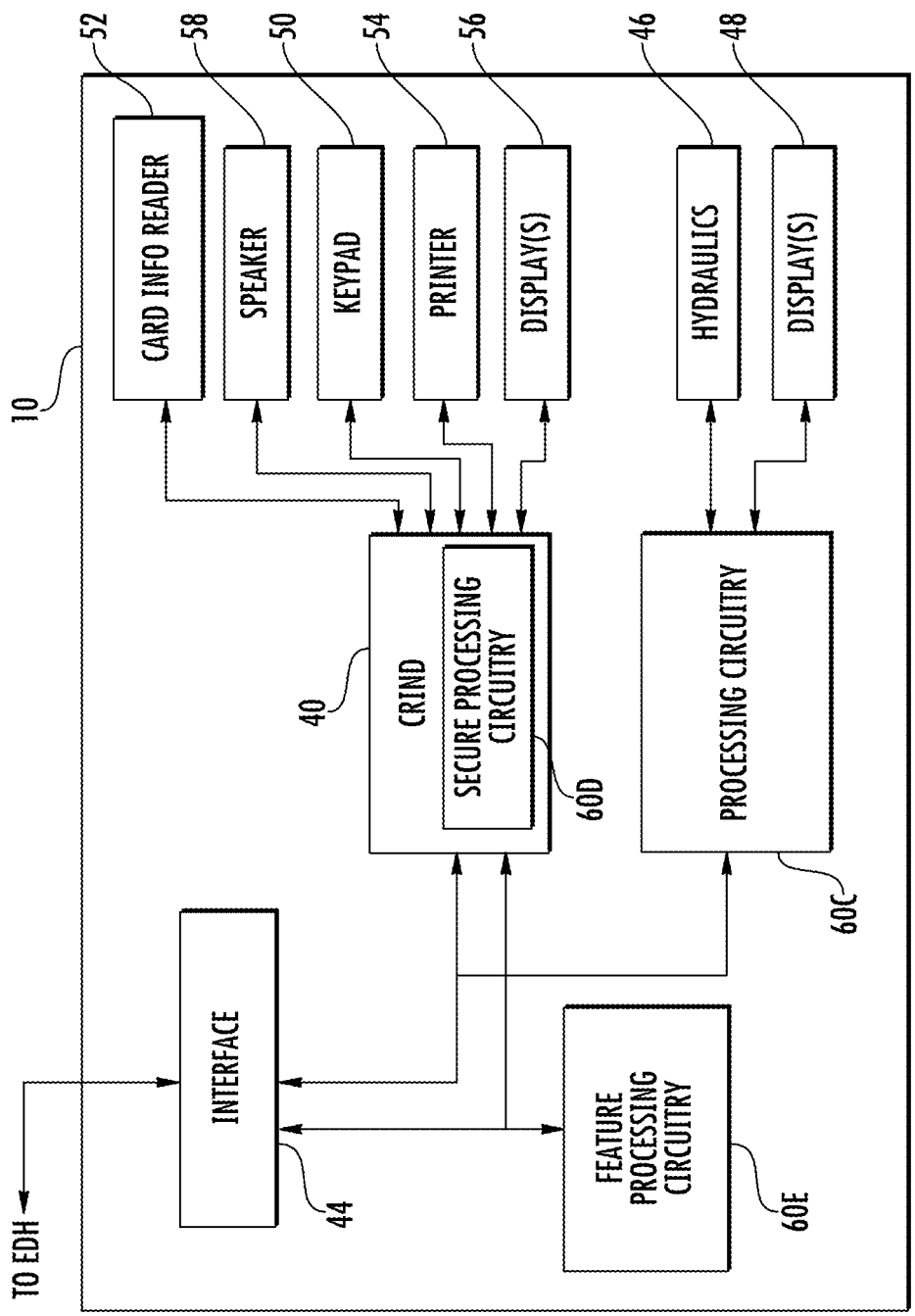
FIG. 3A is a diagrammatic representation showing additional details of a fuel dispenser shown in FIG. 1.

Referring now to FIG. 3A, additional details regarding the various components of fuel dispenser 10 can be more easily explained. As shown, fuel dispenser 10 includes processing circuitry 60C. In addition, dispenser 10 comprises a CRIND apparatus 40 which may be associated with or include processing circuitry 60D. Those of ordinary skill in the art are familiar with CRIND units used in fuel dispensers, but additional background information is provided in U.S. Pat. No. 4,967,366, the entirety of which is incorporated by reference herein for all purposes. In this embodiment, dispenser 10 further includes feature processing circuitry 60E.

As shown, processing circuitry 60C, feature processing circuitry 60E, and CRIND apparatus 40, of the fuel dispenser 10, are in operative communication with EDH 14 via an interface 44. In addition, the processing circuitry 60C, feature processing circuitry 60E, and CRIND apparatus 40 may be in wired or wireless communication with the internet and/or one or more remote servers 19 (e.g., in the "cloud") via off-site communication link 18, as depicted in FIG. 1, or another suitable communication link.

Processing circuitry 60C includes the hardware and software necessary to control the hydraulic components and functions of dispenser 10. Those of ordinary skill in the art are familiar with the operation of the hydraulics 46 of dispenser 10. In general, however, fuel from USTs is pumped through a piping network into an inlet pipe. Fuel being dispensed passes through a flow meter, which is responsive to flow rate or volume. A displacement sensor, such as a pulser, is employed to generate signals in response to fuel flow though the meter and communicate this information to processing circuitry 60C. Processing circuitry 60C may also provide control signaling to a valve that may be opened and closed to permit or not permit dispensing of fuel.

Meter flow measurements from the displacement sensor are collected by processing circuitry 60C. Processing circuitry 60C also typically performs calculations such as cost associated with a fuel dispensing transaction. As a dispensing transaction progresses, fuel is then delivered to a hose and through a nozzle into the customer's vehicle. Dispenser 10 includes a nozzle boot, which may be used to hold and retain the nozzle when not in use. The nozzle boot may include a mechanical or electronic switch in communication with processing circuitry 60C to indicate when the nozzle has been removed for a fuel dispensing request and when the nozzle has been replaced, signifying the end of a fueling transaction. CRIND apparatus 40, due to its connectivity with processing circuitry 60C, may thus determine whether a transaction has been initiated or completed.

Processing circuitry 60C may be further operative to control one or more displays 48. For example, a transaction price total display may present customers with the price for fuel that is dispensed. A transaction gallon total display may be used to present customers with the measurement of fuel dispensed in units of gallons (or liters). Finally, price per unit (PPU) displays may be provided to show the price per unit of fuel dispensed in either gallons or liters, depending on the programming of dispenser 10.

CRIND apparatus 40 includes secure processing circuitry 60D configured to support payment processing and peripheral interfaces at dispenser 10. In this regard, CRIND apparatus 40 may be in operative communication with several peripheral input devices. For example, a PIN pad 50 is typically used for entry of a PIN if the customer is using a debit card for payment of fuel or other goods or services or a customer's billing postal (e.g., "zip") code if a credit card is used. CRIND apparatus 40 may also be in operative communication with a card information reader 52 for accepting credit, debit, or other magnetic stripe cards (or chip cards) for payment. Additionally, card information reader 52 may be configured to accept loyalty or program-specific cards as is well known. (Devices configured to accept payment information through wireless transmission such as NFC or Bluetooth are included within the term "card information reader" as used herein.) Further, CRIND apparatus 40 may be in operative communication with other payment or transactional devices such as a receipt printer 54.

One or more display(s) 56 may be used to display information, such as transaction-related prompts, to the customer. The customer may use soft keys adjacent the display 56 to respond to information requests presented to the user. In some embodiments, however, a touch screen may be used for display 56. In this case, display 56 may be configured to display a virtual keypad for receiving payment data such as a PIN or the billing postal code. Display 56 may also be used in this case to receive a selection from the customer regarding the displayed information. A speaker 58 may also be provided to convey audio information or other sounds to a user.

Feature processing circuitry 60E is operative to provide alternative content (e.g., content typically unrelated to the fueling and payment process or which appropriately supplements fueling prompts such as instructional animations), such as advertising, merchandising, and multimedia content to the customer via display 56 and/or speaker 58 when basic transaction functions are not occurring. The feature processor may receive the content from a local memory associated with the fuel dispenser 10, a site memory associated with a fueling environment 1, and/or the remote server 19. The graphical user interface provided by the fuel dispenser 10 may also allow customers to purchase goods and services other than fuel. For example, the customer may purchase a car wash and/or order food from the store while fueling a vehicle.

Referring again to FIG. 1, POS 12 includes a server 59 having processing circuitry 60A. In the present example, processing circuitry 60A operates in conjunction with a memory 61 to execute several software modules including manager workstation module 62 and cashier workstation module 64. When executed, manager workstation module 62 displays a GUI on manager workstation 66 that allows the owner, operator, or manager of the fueling station to set options for the fueling environment. Manager workstation module 62 is also adapted to provide point-of-sale ("POS") capabilities, including the ability to conduct transactions for items offered for sale by the fueling station. Toward this end, manager workstation 66 includes a suitable display 68, such as a touchscreen display, and may further include one or more speakers 70. As one skilled in art will appreciate, server 59 and manager workstation 66 may be incorporated into the same hardware.

Similarly, cashier workstation module 64 provides the station's cashier, clerk, or employee the means necessary to effect a transaction for one or more items or services offered by the fueling station. Cashier workstation module 64 communicates with the hardware of cashier workstation 72, which includes its own display 74 and optional speaker(s) 76.

In operation, a user positions a vehicle adjacent to one of dispensers 10 and uses the dispenser to refuel the vehicle. For payment, the user may insert and remove a payment card from card information reader 52. Card information reader 52 reads the information on the payment card, which is then sent to forecourt module 20 via the CRIND apparatus 40 and card reader module 26. The forecourt module 20 provides the payment information to network payment module 22, which contacts host processing system 16 operated by the financial institution associated with the user's payment card. The financial institution either validates or denies the transaction and transmits such a response to network payment module 22. The information received from the financial institution's host computer system is transmitted from network payment module 22 back to forecourt module 20 to handle appropriately. This may include transmitting to CRIND apparatus 40 a request that the user provide another payment card if the transaction is denied, or printing a receipt if authorized.

For additional information regarding retail fueling environments, reference is made to U.S. Pat. No. 6,435,204 (entitled "Fuel Dispensing System"), U.S. Pat. No. 5,956,259 (entitled "Intelligent Fueling"), U.S. Pat. No. 5,734,851 (entitled "Multimedia Video/Graphics in Fuel Dispensers"), U.S. Pat. No. 6,052,629 (entitled "Internet Capable Browser Dispenser Architecture"), U.S. Pat. No. 5,689,071 (entitled "Wide Range, High Accuracy Flow Meter"), and U.S. Pat. No. 6,935,191 ("entitled "Fuel Dispenser Fuel Flow Meter Device, System and Method"), all of which are hereby incorporated by reference for all purposes as if set forth verbatim herein.

In operation, the forecourt module 20 transmits one or more transaction messages to the CRIND apparatus 40 to cause CRIND apparatus 40 to control the peripheral devices, accept payment information, and/or show transactional prompts on the display 56. The transaction messages may be a portion of a fueling transaction script, e.g., using SPOT protocol, configured to control a fuel dispenser 10 for a fueling operation. The transaction messages may cause the CRIND apparatus 40 to activate various peripheral devices, such as the card information reader 52, keypad 50, printer 54, or the like and/or cause one or more fueling operation prompts to be displayed on the display 56. The actual fueling operation prompts may be stored at a memory associated with the CRIND, such that the CRIND receives a transaction message indicating the fueling operation prompt to display. Additionally or alternatively, the fueling operation prompts may be supplied to the CRIND module 40 as a portion of a transaction message.

Figure 3B:
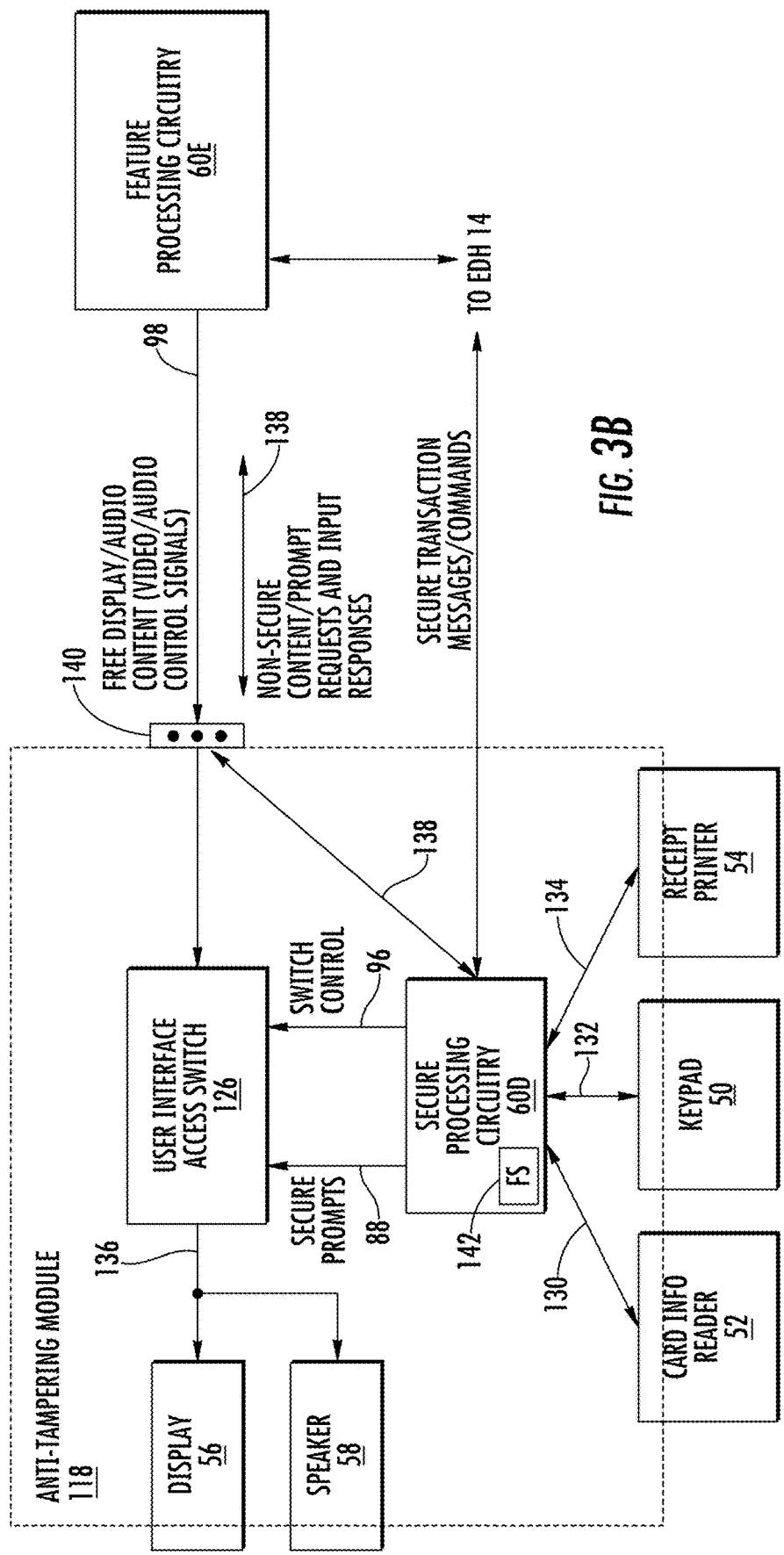
FIG. 3B illustrates a block diagram of an exemplary alternative feature switching system for use in a fuel dispenser shown in FIG. 1.

The feature processing circuitry 60E may provide alternative content to the display 56 and speaker 58 via the CRIND apparatus 40. Referring now to FIG. 3B, the CRIND apparatus 40 may allow content to be provided to the display 56, speaker 58, or the like via a user interface access switch 126. As shown, switch 126 is part of a switching system that functions to control secure prompting at fuel dispenser 10 but which allows alternative content to be presented at the fuel dispenser during appropriate phases of the fueling process. In the depicted embodiment, an anti-tampering module 118 protects input devices, such as the card information reader 52 and the keypad 50, and output devices, such as the display 56, the speaker 58, and the receipt printer 54, from tampering. As one skilled in the art will understand, anti-tampering module 118 will typically include physical and electrical measures to prevent access to components contained inside, such as the secure processing circuitry 60D and the communication paths to and from the peripherals. Such measures may include, for example, a wire mesh that indicates if an intrusion is attempted. Accordingly, a would-be hacker will not have direct access to any control or data signals associated with these input and output devices. Additionally or alternatively, signal cabling extending outside of the anti-tampering module 118 may be secure cabling and/or the electrical control signals may be encrypted.

As shown, the secure processing circuitry 60D interfaces with the card reader 52, the keypad 50, and the receipt printer 54 via control/data lines 130, 132, and 134, respectively. The secure processing circuitry 60D also controls the user interface access switch 126 via the user interface control lines 96 to selectively control whether feature processing circuitry 60E may drive the display 56 and the speaker 58. Secure prompts, e.g. payment prompts for the fueling operation, may be provided to the display 56 and/or the speaker 58 from the secure processing circuitry 60D via the control/data lines 88. Control and data signals for the display 56 and the speaker 58 are passed from the user interface access switch 126 via control/data lines 136. Alternatively, should the feature processing circuitry 60E desire to provide content (e.g., including prompts) to a user via the display 56, the feature processing circuitry 60E may initiate alternative content/prompt requests to the secure processing circuitry 60D via a line 138. When such a prompt request is made, the secure processing circuitry 60D may provide a requested prompt via the control/data lines 88, the user interface access switch 126, and the control/data lines 136 to the display 56 and the speaker 58. In this way, any responses provided via the peripherals (such as keypad 50) is always under the control of secure processing circuitry 60D. Feature processing circuitry 60E may be connected to the anti-tampering module 118 via the external interface connector 140. Additional information regarding the user interface access switch may be found in U.S. Pub. App. No. 2009/0265638A1 (Ser. No. 12/287,688), the entirety of which is incorporated herein by reference for all purposes.

When the secure processing circuitry 60D is not in a secure processing mode, for example, during specified transaction phases such as idle (e.g., a transaction is not being performed), during fueling (i.e., the time in which fuel is allowed to flow), or when the secure processing circuitry 60D has not requested a response from the user, the secure processing circuitry 60D may switch the state of the user interface access switch 126 via user interface control lines 96 to allow the feature processing circuitry 60E to drive content over control/data lines 98 to the display 56 and the speaker 58.

In an example embodiment, the CRIND apparatus 40 may be configured to determine a transaction phase of the fueling operation based on the messages sent to or received from the forecourt controller. By determining the phase of a fueling transaction, the CRIND apparatus 40, by itself or in collaboration with feature processing circuitry 60E, is thus able to select specific non-transaction related or supplementary content to be provided to the customer via display 56 and/or speaker 58. This allows increased functionality of the peripheral devices associated with the fuel dispenser and increased opportunities to display content to a customer during a fueling operation.

Toward this end, the CRIND apparatus 40 may receive one or more transaction messages from the forecourt module 20 and/or the peripheral devices. Some example transaction messages may include enable card reader, enable soft keys, enable PED (PIN entry device) or touchscreen, initialize screen message X, disable card reader, disable soft keys, enable printer, or the like. Transaction messages from the peripheral devices may include touch input from the keypad or display 56, payment data from the card information reader 52, a nozzle cradle status, or the like. The messages are processed in the usual way but are detected by feature synchronization ("FS") module 142 comprising computer readable instructions running on secure processing circuitry 60D. FS module 142 is then operative to compare the transaction messages to stored transaction information associated with various transaction phases of a fueling operation. The transaction phases may include, without limitation, idle, secure processing, fuel grade prompt, receipt printing, fueling, fueling complete, or the like.

In this way, the CRIND apparatus 40 infers the transaction phase based on the exchange of messages between the CRIND apparatus 40 and the forecourt controller. The idle transaction phase may be characterized as the status of the fuel dispenser 10 when no fueling operation is in progress. The secure processing transaction phase may be associated with receiving payment data including card information, PIN number, billing postal code, or the like. The fuel grade prompt transaction phase may be associated with the portion of the fueling operation after the payment has been authorized prior to the commencement of fueling, in which the customer is prompted to select a fuel grade and extract the fuel nozzle from a fuel cradle to begin fueling. The fueling phase may be associated with the portion of the fueling operation after the fuel grade has been selected, in which operation of a fuel nozzle trigger will cause fuel to be dispensed. The fueling complete transaction phase may be associated with the portion of the fueling operation after the fuel nozzle has been replaced in the fuel nozzle cradle. The receipt printing transaction phase may be associated with the portion of the fueling operation in which a receipt may be printed for the transaction. It would be immediately understood by one of ordinary skill in the art that the preceding transaction phases are merely for illustrative purposes and that other transaction phases are contemplated.

As noted above, the CRIND apparatus 40 may be configured to compare the one or more messages to stored message information associated with the transaction phases of the fuel dispenser and determine a transaction phase based on the comparison. In some instances, one transaction message may be sufficient to determine the transaction phase, in other instances, a transaction message may be used in multiple transaction phases and, therefore, multiple transaction messages may be compared to determine the transaction phase. Transaction messages associated with the idle transaction phase may include enable card reader (ready to accept a card), enable soft keys (to accept customer selections), enable PED with one key (enables selection as an alternative to soft keys), initialize display screen with first message content ("Welcome to our fueling station, insert card to initiate a transaction" or similar message), or the like. Transaction messages associated with a secure processing transaction phase may include prompts shown on the display 56, payment information from the card information reader 52, or the like. Transaction messages associated with the fuel grade prompt may include a transaction authorization, disable card reader, initialize display screen with second message content ("Select a fuel grade and remove nozzle to begin fueling" or similar), or the like. The fueling phase may be associated with transaction messages including enable soft keys for coupons associated with advertisements, disable card readers, initialize display screen with third message content ("Fueling now" or similar), or the like. The receipt printing transaction phase may be associated with transaction messages including initialize display screen with fourth message content ("Do you want a receipt?" or similar), enable PED (to receive yes or no response to receipt printing), enable printer, or the like. The fueling complete transaction phase may be associated with transaction messages including initialize display screen with fifth message content ("Thank you and Goodbye" or similar), or the like.

Based on a determination of the transaction phase as described, the CRIND apparatus 40 may be configured to cause the feature processing circuitry 60E to provide selected alternative media or other content to a user interface, such as display 56 and/or speaker 58. For example, the feature processing circuitry 60E may provide advertisements for carwashes, cold or hot drinks, food, or other goods and/or services, request to join a loyalty program, or the like during the fueling and/or idle transaction phases. The feature processing circuitry 60E may provide animations to visually instruct the customer of action in the fueling operation during the idle, fuel grade prompt, and receipt printing transaction phases. The feature processing circuitry 60E may provide interactive advertisements or entertainment during a fueling transaction phase, such as virtual scratch tickets, or other games, or printable coupon prompts. The feature processing circuitry 60E may provide a fuel grade recommendation, advertisements, or the like during the fuel grade prompt transaction. During the receipt printing and/or fueling complete transaction phase, the feature processing circuitry 60E may provide advertisements for one or more goods or services such as products sold inside the convenience store. The feature processing circuitry 60E may be configured to retrieve the selected alternative content from one or more local memories inside fuel dispenser 10, a site server located inside the convenience store, or the remote server 19.

Referring back to FIG. 3B, the CRIND apparatus 40, particularly the secure processing circuitry 60D, may be configured to cause the user interface access switch 126 to allow media content to be transmitted to the user interface from the feature processing circuitry 60E. For example, the secure processing circuitry 60D may cause the user interface access switch 126 to allow selected alternative media content, such as advertisements, animations, and games, to be transmitted to the user interface during the idle, fueling, grade selection prompt, receipt printing, and/or fueling complete transaction phases. The particular content selected will generally be associated with or otherwise appropriate for the transaction phase that is occurring. (Of course, some such content may be appropriate for multiple phases.) In an instance in which the CRIND apparatus 40 determines that the transaction phase is secure processing, the secure processing circuitry 60D may cause the user interface access switch 126 to prevent non-secured media, such as from the feature processing circuitry 60E, from being transmitted to the user interface, e.g., display 56 and/or speaker 58, or the like.

Additionally or alternatively, the CRIND apparatus 40 may be configured to cause one or more actions to be performed by a peripheral device based on the transaction phase. For example, the CRIND apparatus 40 may enable touch screen function of the display 56, enable soft keys, enable the card information reader 52, enable the printer 54, or the like. The touch screen functionality or soft keys may be utilized for user interaction with a virtual scratch ticket or other game for advertisement or entertainment, for selection of a coupon associated with an advertisement, or the like. The card information reader 52 may be utilized to scan a loyalty card, coupon, or the like. The printer 54 may be utilized to print the selected coupons immediately or in conjunction with printing of the receipt.

The ability to determine the transaction phase of the fuel dispenser 10 by the CRIND apparatus 40 creates many additional opportunities to interact with the customer and/or provide content to the customer, which were not previously available without changing the fueling transaction scripts executed by the forecourt controller. Since multiple fueling environments 1 may share a common fueling transaction script, a CRIND apparatus 40 may be trained once for the common fueling transaction script and used by other CRINDs in the same or different fueling environments. In this regard, feature synchronization module 142 may have a training mode in which training activities are performed before changing over to a regular operational mode.

In an example embodiment, the transaction phases may be learned by a CRIND apparatus 40 in a training mode, automatically or with technician assistance. Utilizing an automatic learning training mode, the CRIND module 40 may monitor the transaction messages, e.g., receive one or more transaction messages from the forecourt module 20 and/or peripheral devices, and determine a transaction phase based on a transaction phase criteria, such as a time interval associated with a transaction message. The CRIND apparatus 40 may determine after one or more transaction cycles, e.g., fueling operations, that the longest interval between transaction messages is preceded by a specified transaction message (such as initialize display screen with fifth content "Thank you and goodbye" or the like) or sequence of transaction messages. Because the longest phase is known to be the idle phase, the CRIND apparatus 40 may then infer that these transaction messages are indicative of the idle phase.

Similarly, the CRIND apparatus 40 may determine that the second longest interval between transaction messages is preceded by a another transaction message (such as disable card readers, initialize the display screen with second content "Select a grade and remove nozzle to begin fueling," an indication of a selected grade or removal of the fuel nozzle from the fuel nozzle cradle, or the like) or sequence of transaction messages. The CRIND apparatus thus associates the transaction message sequence with a second transaction phase, such as fueling.

In an example embodiment in which the training mode is technician assisted, a separate computing device, such as a laptop, tablet computer, smartphone, or personal digital assistant may be connected to the CRIND apparatus 40 (e.g., by USB) to provide an indication of one or more transaction phases during a fueling operation or a simulated fueling operation. In this regard, the CRIND apparatus 40 may receive a first one or more transaction messages from the forecourt module 20 and/or the peripheral devices. The technician, knowing the transaction phase, may enter the phase into the computing device. For example, the computing device may be running a companion application which is configured to communicate with the feature synchronization module 142 in the training mode. The companion application may have, for example, a drop down menu that lists the various transaction phases. The technician can thus easily select the current phase to send to the CRIND apparatus 40. As a result, the CRIND apparatus 40 may associate the transaction messages with the indicated transaction phase. It may be desirable to perform the training operation in several iterations to ensure the best accuracy in the associations. In particular, the CRIND apparatus 40 may then receive subsequent transaction messages and indications of transaction phases for comparison with previous results.

Based on the comparison of the transaction messages, the CRIND apparatus 40 may determine a transaction message sequence for each of the transaction phases. For example, the CRIND apparatus 40 may observe transaction messages which appear multiple times for the indicated transaction phase and ignore transaction messages which appear once or few times, indicating that the transaction message may not necessarily be associated with the transaction phase.

One skilled in the art will appreciate that the application running on the separate computing device may alternatively provide a simulated CRIND containing feature synchronization module 142. The training can then occur entirely by simulation of fueling transactions, which the results being later published to a suitable CRIND.

Figure 8:
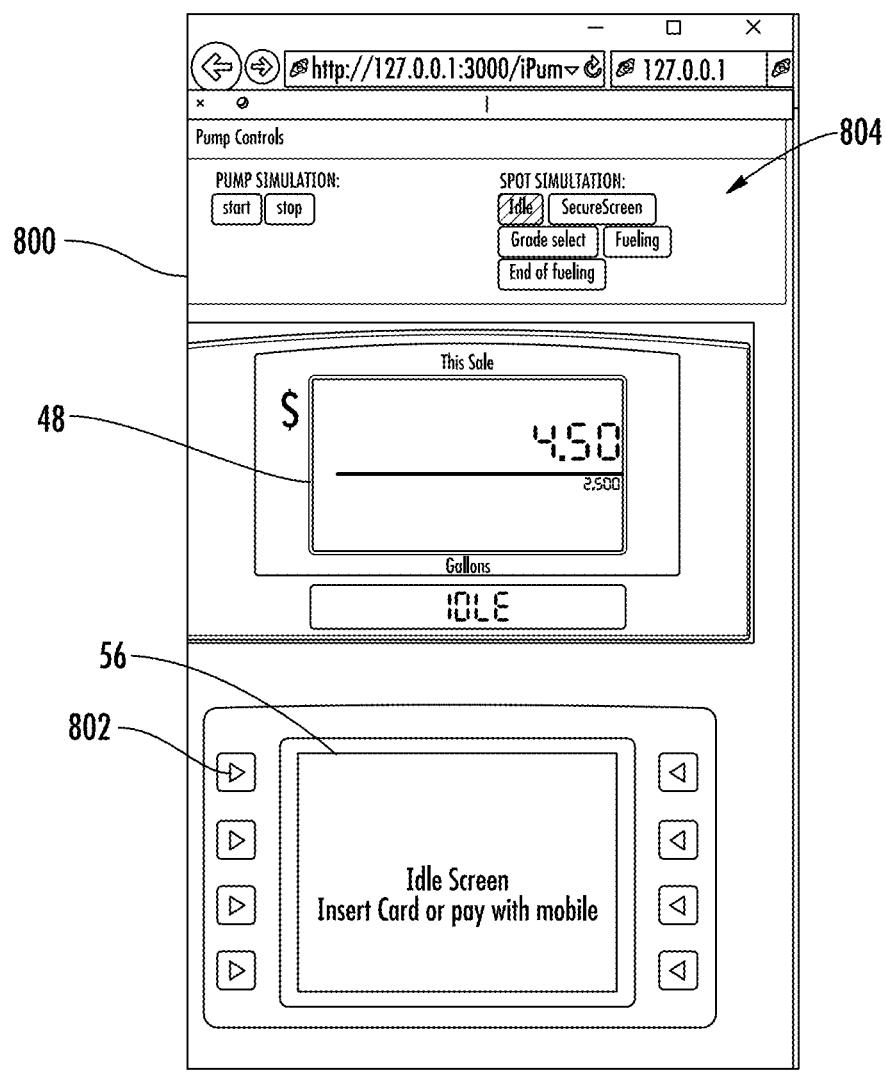
FIGS. 8-9 respectively show an exemplary training interface and an exemplary testing interface on a technician computing device.

Referring now to FIG. 8, the computing device in a preferred embodiment may include a training interface 800. The training interface 800 may include a simulation of the sales display 48, the display 56, soft keys 802, or the like. Additionally, the training interface 800 may include a selector 804, such as a button, dropdown menu, text field or the like, for the user to select a transaction phase associated with the current phase of the fueling operation.

Figure 9:
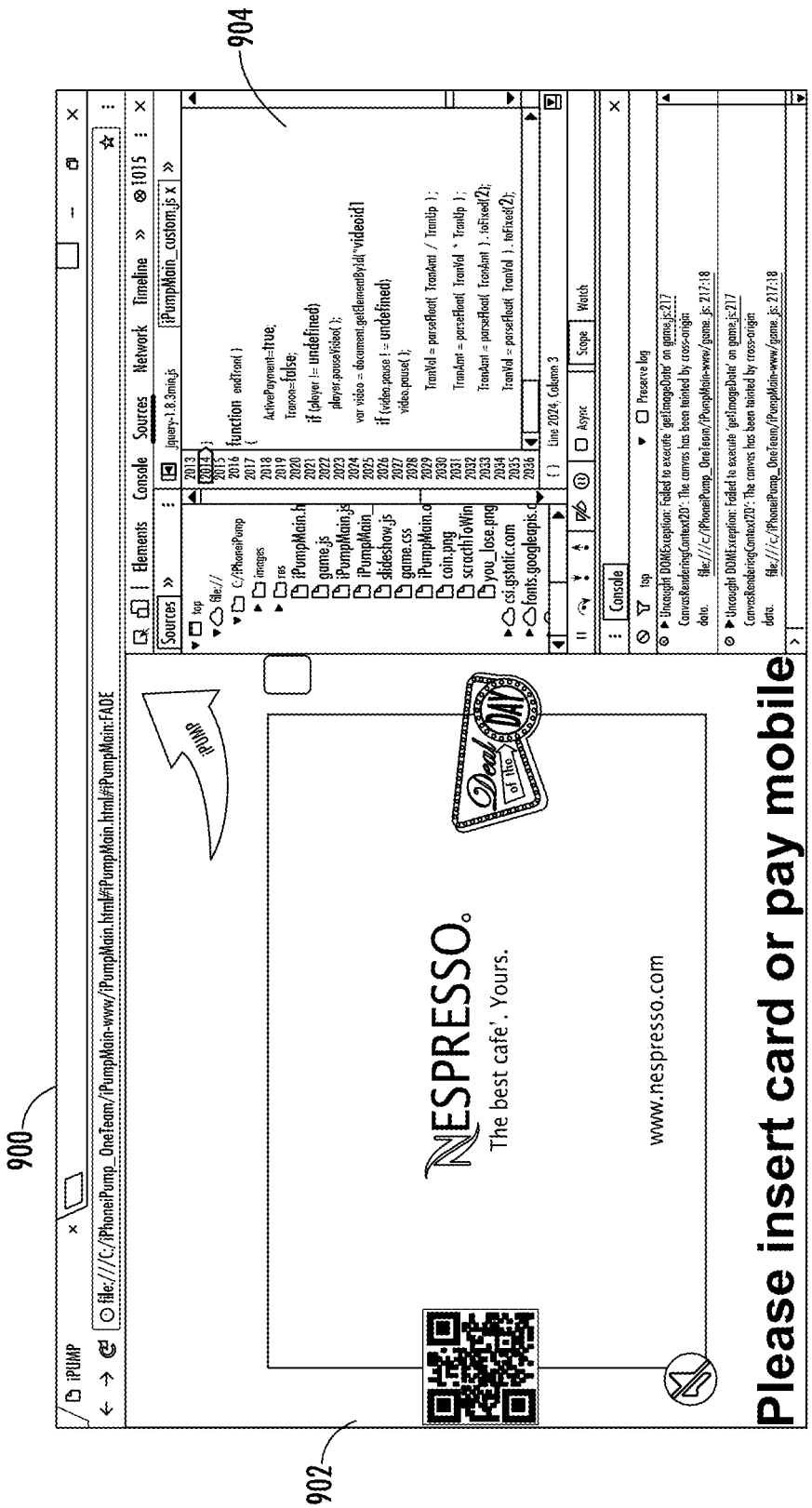

Referring now to FIG. 9, the computing device in a preferred embodiment may include a testing interface 900 including a display simulation 902 and a debugging interface 904.

In some example embodiments, the computing device may publish the training data for the CRIND apparatus 40 to a remote server 19. The training data may be downloaded or pushed to any compatible CRIND.

Example Processing Circuitry

Figure 4:
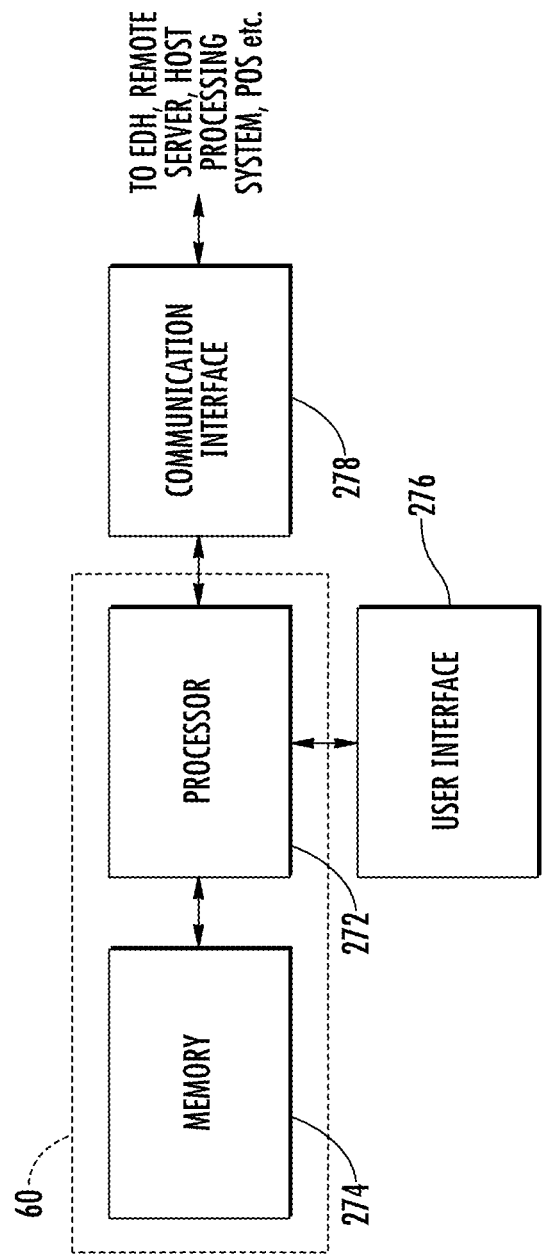
FIG. 4 illustrates a block diagram of one example of processing circuitry according to an embodiment of the present invention.

FIG. 4 shows certain elements of processing circuitry 60 for a fuel dispenser 10, POS 12, EDH 14, and/or CRIND apparatus 40. The processing circuitry 60 of FIG. 4 may be employed, for example, on onboard circuitry within the fuel dispenser 10, POS 12, EDH 14, and/or CRIND apparatus 40, in circuitry associated with a convenience store, a network device, server, proxy, or the like, as discussed above in reference to processing circuitry 60A, 60B, 60C, 60D, and 60E. Alternatively, embodiments may be employed on a combination of devices. Furthermore, it should be noted that the devices or elements described below may not be mandatory and thus some may be omitted in certain embodiments.

The processing circuitry 60 is configured to perform data processing, application execution and other processing and management services according to example embodiments of the present invention. The processing circuitry 60 may include a processor 272 and a memory 274. Processor 272 may be in communication with or otherwise control a user interface 276 and a communication interface 278. As such, the processing circuitry 60 may be embodied as a circuit chip (e.g., an integrated circuit chip) configured (e.g., with hardware, software or a combination of hardware and software) to perform operations described herein. However, in some embodiments, the processing circuitry 60 may be embodied as a portion of a server, computer, or workstation. In situations where the processing circuitry 60 is embodied as a server or at a remotely located computing device, the user interface 276 may be disposed at another device (e.g., at a computer terminal or client device such as the fuel dispenser 10) that may be in communication with the processing circuitry 60 such as via the communication interface 278.

The network by which the processing circuitry communicates with other components may be a data network, such as a local area network (LAN), a metropolitan area network (MAN), a wide area network (WAN) (e.g., the Internet), and/or the like, which may couple the fuel dispenser 10, POS 12, EDH 14, and/or CRIND apparatus 40 to devices such as processing elements (e.g., computer terminals, server computers or the like) and/or databases. Communication between the network, the devices or databases may be accomplished by either wireline or wireless communication mechanisms and corresponding communication protocols.

The user interface 276 may be an input/output device for receiving instructions directly from a user. The user interface 276 may be in communication with the processing circuitry 60 to receive user input via the user interface 276 and/or to present output to a user as, for example, audible, visual, mechanical or other output indications. The user interface 276 may include, for example, a keyboard, a mouse, a joystick, a display (e.g., a touch screen display), a microphone, a speaker, or other input/output mechanisms. Further, the processing circuitry 60 may comprise, or be in communication with, user interface circuitry configured to control at least some functions of one or more elements of the user interface 276. The processing circuitry 60 and/or user interface circuitry may be configured to control one or more functions of one or more elements of the user interface 276 through computer program instructions (e.g., software and/or firmware) stored on a memory device accessible to the processing circuitry 60 (e.g., volatile memory, non-volatile memory, and/or the like). In some example embodiments, the user interface circuitry is configured to facilitate user control of at least some functions of the apparatus through the use of a display configured to respond to user inputs. The processing circuitry 60 may also comprise, or be in communication with, display circuitry configured to display at least a portion of a user interface 276, the display and the display circuitry configured to facilitate user control of at least some functions of the apparatus.

The communication interface 278 may be any means such as a device or circuitry embodied in either hardware, software, or a combination of hardware and software that is configured to receive and/or transmit data from/to a network and/or any other device or module in communication with the processing circuitry 60, the fuel dispenser 10, the POS 12, EDH 14, and/or CRIND apparatus 40 of the fueling environment (and/or a remote cloud server, either directly or via a router located in the fueling environment). In some instances, the communications interface 278 may be referred to as a cloud connection processor (CCP) and may provide secured, e.g., encrypted, communication between the processing circuitry, the network, and/or remote servers. The communication interface 278 may also include, for example, an antenna (or multiple antennas) and supporting hardware and/or software for enabling communications with the network or other devices (e.g., a user device). In some embodiments, the communication interface 278 may alternatively or additionally support wired communication. As such, for example, the communication interface 278 may include a communication modem and/or other hardware/software for supporting communication via cable, digital subscriber line (DSL), universal serial bus (USB), or other mechanisms. In an exemplary embodiment, the communication interface 278 may support communication via one or more different communication protocols or methods. In some cases, IEEE 802.15.4 based communication techniques such as ZigBee or other low power, short range communication protocols, such as a proprietary technique based on IEEE 802.15.4 may be employed along with radio frequency identification (RFID) or other short range communication techniques.

Example Flowchart(s) and Operations

Embodiments of the present invention provide methods, apparatus and computer program products for operating a transaction system such as in a fueling environment. Various examples of the operations performed in accordance with embodiments of the present invention will now be provided with reference to FIGS. 5-7.

Figure 5:
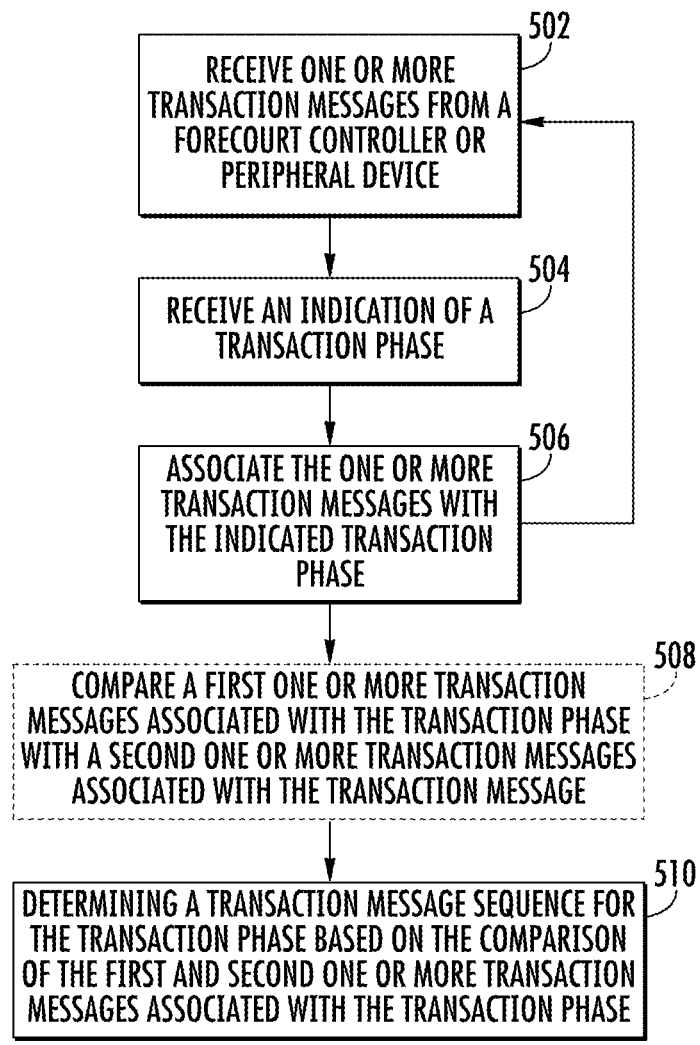
FIGS. 5-7 illustrate methods of utilizing a CRIND apparatus according to example embodiments of the present invention.
Figure 6:
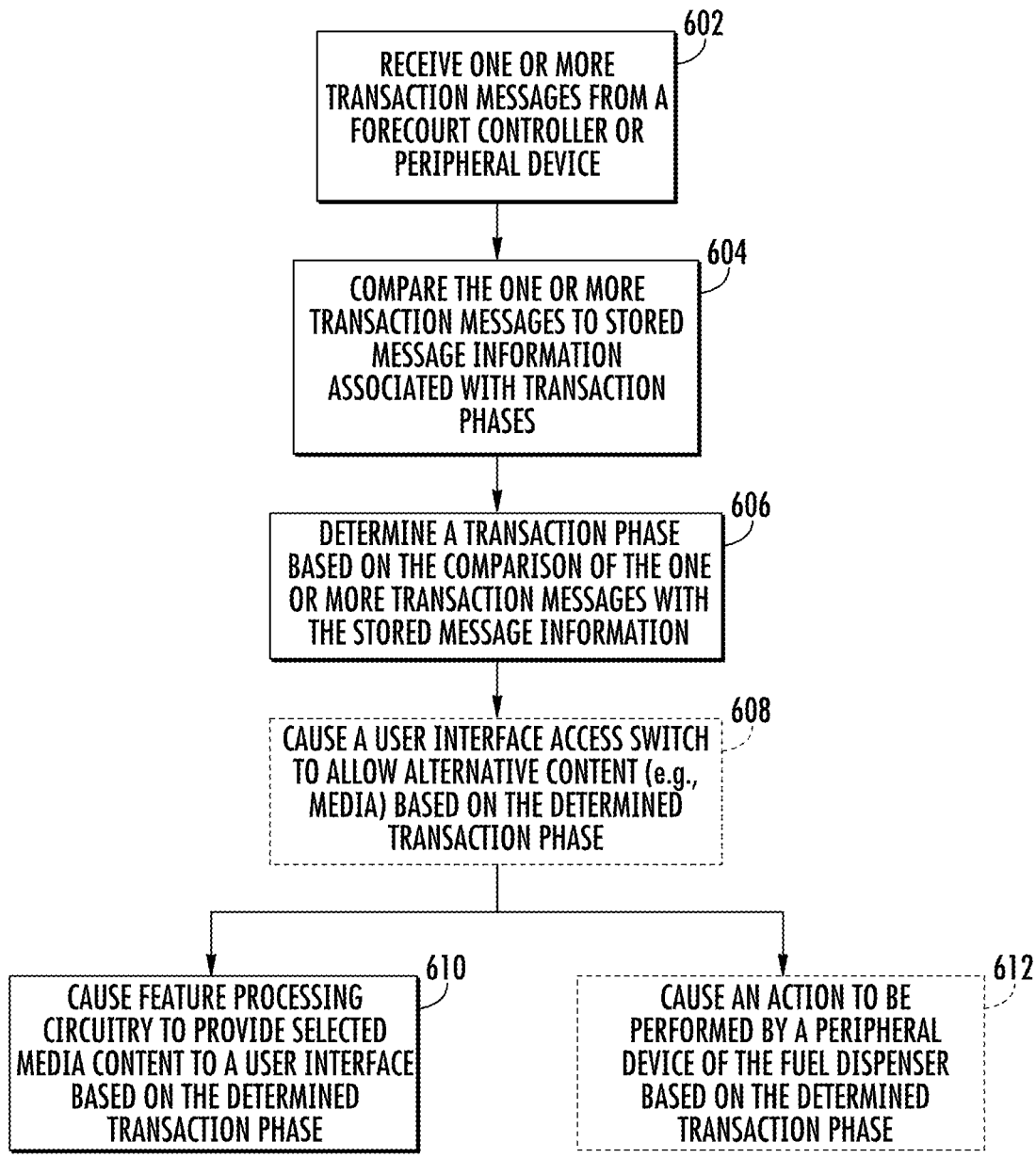
Figure 7:
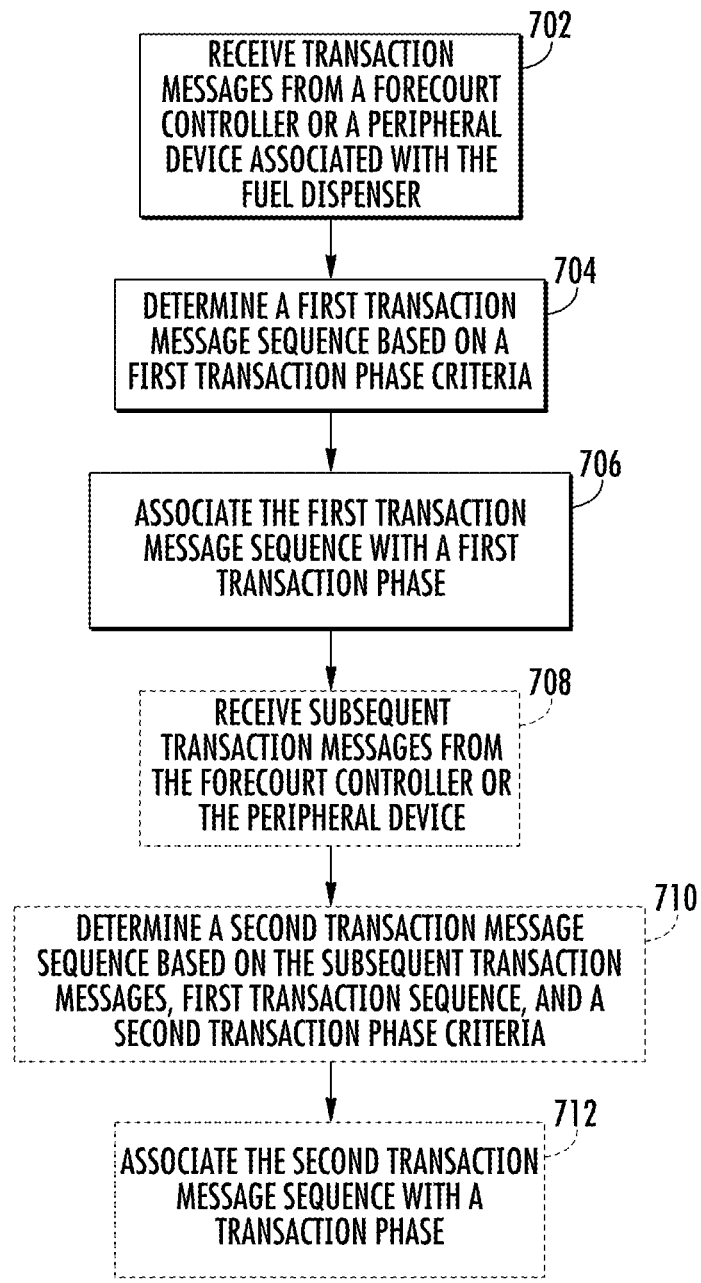

FIGS. 5-7 illustrate flowcharts according to an example method for determining transaction phases from message flow in order to control alternative feature content. The operations illustrated in and described with respect to FIGS.

5-7 may, for example, be performed by, with the assistance of, and/or under the control of one or more of the processor 272, memory 274, communication interface 278, and/or user interface 276. Referring specifically to FIG. 5, a method may include receiving one or more transaction messages from a forecourt controller or peripheral device at operation 502, receiving an indication of a transaction phase at operation 504, associating an indication of a transaction phase with the transaction messages at operation 506, and determining a transaction message sequence for the transaction phase based on the comparison of the one or more transaction messages associated with the transaction phase at operation 510.

Referring now to FIG. 6, a second method may include receiving one or more transaction messages from a forecourt controller or a peripheral device at operation 602, comparing the one or more transaction messages to stored message information associated with transaction phases at operation 604, determining a transaction phase based on the comparison of the one or more transaction messages with the stored message information, and causing feature processing circuitry to provide selected alternative content to a user interface based on the determined transaction phase at operation 610.

Referring now to FIG. 7, a third method may include receiving transaction messages from a forecourt controller or a peripheral device associated with the fuel dispenser at operation 702, determining a first transaction message sequence at operation 704, and associating the first transaction message sequence with a first transaction phase at operation 706.

In some embodiments, the methods may include additional, optional operations, and/or the operations described above may be modified or augmented. Some examples of modifications, optional operations, and augmentations are described below, as indicated by dashed lines, such as, comparing a first one or more transaction messages associated with the transaction phase with a second one or more transaction messages associated with the transaction message at operation 508. The second method may further include causing a user interface access switch to allow alternative media based on the determined transaction phase at operation 608 and/or causing an action to be performed by a peripheral device of the fuel dispenser based on the determined transaction phase at operation 612. The third method may also include receiving subsequent transaction messages from the forecourt controller or peripheral device at operation 708, determining a second transaction message sequence based on the subsequent transaction messages, first transaction sequence, and a second transaction phase criteria at operation 710, and/or associating the second transaction message sequence with a transaction phase at operation 712.

FIG. 5-7 illustrate flowcharts of systems, methods, and computer program products according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory 274 and executed by, for example, the processor 272. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device (for example, CRIND apparatus 40 of the fuel dispenser 10) to cause a series of operations to be performed on the computer or other programmable apparatus to produce a computer-implemented process such that the instructions which execute on the computer or other programmable apparatus implement the functions specified in the flowchart block(s).

In some embodiments, the system may be further configured for additional operations or optional modifications. In this regard, in an example embodiment, the memory and the computer program code are further configured to cause a user interface access switch to allow alternative media content to be transmitted to the user interface based on the determined transaction phase. In some example embodiments, the memory and the computer program code are further configured to cause an action to be performed by a peripheral device of the fuel dispenser based on the determined transaction phase. In some example embodiments, the transaction phase is idle. In some example embodiments, the transaction phase is fueling. In an example embodiment, the transaction phase is fuel grade prompt. In some example embodiments, the transaction phase is receipt printing. In some example embodiments, the transaction phase is fueling complete. In some example embodiments, the memory and the computer program code are further configured to receive a subsequent one or more transaction messages from a forecourt controller and determine a second transaction phase based on the subsequent transaction messages, wherein the second transaction phase is secure processing. In some example embodiments, the memory and the computer program code are further configured to cause a user interface access switch to prevent alternative (e.g., non-secure) media content from being transmitted to the user interface based on the secure processing transaction phase.

In some example embodiments, the memory and the computer program code are further configured to receive a second one or more transaction messages, receive a second indication of the transaction phase from a separate computing device, associate the transaction messages with the indicated transaction phase, compare the first one or more transaction messages associated with the transaction phase to the second one or more transaction messages associated with the transaction messages, and determine a transaction message sequence for the transaction phase based on the comparison of the first and second one or more transaction messages associated with the transaction phase. In an example embodiment, the memory and the computer program code are further configured to receive a subsequent one or more transaction messages from a forecourt controller or a peripheral device associated with a fuel dispenser, determine a second transaction message sequence based on the subsequent one or more transaction messages, the first transaction sequence, and a second transaction phase criteria, and associate the second transaction message sequence with a second transaction phase. In some example embodiments, the first transaction phase is idle. In some example embodiments, the first transaction phase criteria is a predetermined amount of time between transaction messages. In some example embodiments, the second transaction phase criteria is fueling.

Many modifications and other embodiments of the invention set forth herein will come to mind to one skilled in the art to which the invention pertains having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a general and descriptive sense only and not for purposes of limitation.

What is claimed is:

1. An apparatus that is configured to be integrated in a fuel dispenser, the apparatus comprising:
    a CRIND apparatus for location in the fuel dispenser;
    a user interface including a display;
    a user interface access switch; and
    the CRIND apparatus including a processor and a memory storing computer program code, the memory and the computer program code configured to, via the processor, cause the CRIND apparatus to:
        receive one or more transaction messages from a forecourt controller external to the fuel dispenser;
        compare the one or more transaction messages to stored message information associated with transaction phases of the fuel dispenser;
        determine a transaction phase of the fuel dispenser based on the comparison of the one or more transaction messages with the stored message information; and
        cause feature processing circuitry to provide selected alternative content to the user interface based on the determined transaction phase,
    wherein the memory and the computer program code are further configured to cause the user interface access switch to allow the selected alternative content to be transmitted to the user interface based on the determined transaction phase.

2. The apparatus according to claim 1, wherein the memory and the computer program code are further configured to:
    cause an action to be performed by a peripheral device of the fuel dispenser based on the determined transaction phase.

3. The apparatus according to claim 1, wherein the transaction phase is idle.

4. The apparatus according to claim 1, wherein the transaction phase is fueling.

5. The apparatus according to claim 1, wherein the transaction phase is fuel grade prompt.

6. The apparatus according to claim 1, wherein the transaction phase is receipt printing.

7. The apparatus according to claim 1, wherein the transaction phase is fueling complete.

8. The apparatus according to claim 1, wherein the memory and the computer program code are further configured to:
    receive a subsequent one or more transaction messages from the forecourt controller; and
    determine a second transaction phase based on the subsequent transaction messages, wherein the second transaction phase is secure processing.

9. The apparatus according to claim 8, wherein the memory and the computer program code are further configured to:
    cause the user interface access switch to prevent the selected alternative content from being transmitted to the user interface based on the secure processing transaction phase.

10. An apparatus that is configured to be integrated in a fuel dispenser, the apparatus comprising:
    a CRIND apparatus for location in the fuel dispenser;
    a user interface including a display;
    a user interface access switch; and
    the CRIND apparatus including a processor and a memory storing computer program code, the memory and the computer program code configured to, via the processor, cause the CRIND apparatus to:
        receive a first one or more transaction messages from a forecourt controller external to the fuel dispenser;
        receive an indication of a transaction phase from a separate computing device;
        associate the first one or more transaction messages with the indicated transaction phase;
        cause the user interface access switch to allow selected alternative content to be transmitted to the user interface if the indicated transaction phase is a first transaction phase; and
        cause the user interface access switch to prevent selected alternative content from being transmitted to the user interface if the indicated transaction phase is a second transaction phase.

11. The apparatus according to claim 10, wherein the memory and the computer program code are further configured to:
    receive a second one or more transaction messages;
    receive a second indication of the transaction phase from the separate computing device;
    associate the transaction messages with the indicated transaction phase;
    compare the first one or more transaction messages associated with the transaction phase to the second one or more transaction messages associated with the transaction phase; and
    determine a transaction message sequence for the transaction phase based on the comparison of the first and second one or more transaction messages associated with the transaction phase.

12. An apparatus that is configured to be integrated in a fuel dispenser, the apparatus comprising:
    a CRIND apparatus for location in the fuel dispenser;
    a user interface including a display;
    a user interface access switch; and
    the CRIND apparatus including a processor and a memory storing computer program code, the memory and the computer program code configured to, via the processor, cause the CRIND apparatus to:
        receive one or more transaction messages from a forecourt controller external to the fuel dispenser;

determine a first transaction message sequence based on the one or more transaction messages and a first transaction phase criteria; and associate the first transaction message sequence with a first transaction phase; and cause the user interface access switch to allow selected alternative content to be transmitted to the user interface if the indicated transaction phase is the first transaction phase.

13. The apparatus according to claim 12, wherein the memory and the computer program code are further configured to:

receive a subsequent one or more transaction messages from the forecourt controller;

determine a second transaction message sequence based on the subsequent one or more transaction messages, the first transaction sequence, and a second transaction phase criteria; and associate the second transaction message sequence with a second transaction phase.

14. The apparatus according to claim 12, wherein the first transaction phase is idle.

15. The apparatus according to claim 12, wherein the first transaction phase criteria is a predetermined amount of time between transaction messages.

16. The apparatus according to claim 12, wherein the second transaction phase criteria is fueling.

* * * * *